United States Patent [19]
Garbe

[11] 3,874,093
[45] Apr. 1, 1975

[54] RESPIRATORY APPARATUS

[76] Inventor: Dietmar Rudolf Garbe, Maids Moreton House, Maids Moreton, Buckingham, England

[22] Filed: Sept. 14, 1973

[21] Appl. No.: 397,387

[52] U.S. Cl. .................................................. 35/17
[51] Int. Cl. ........................................... G09b 23/32
[58] Field of Search .......................................... 35/17

[56] References Cited
UNITED STATES PATENTS

| | | | |
|---|---|---|---|
| 2,029,682 | 2/1936 | Squires | 35/17 UX |
| 3,209,469 | 10/1965 | James | 35/17 |
| 3,520,071 | 7/1970 | Abrahamson et al | 35/17 |

Primary Examiner—Harland S. Skogquist
Attorney, Agent, or Firm—Bierman & Bierman

[57] ABSTRACT

An anatomical model for teaching the intubation of the human trachea has epiglottis and tongue parts simulated by an assembly which is pivotally movable and biased into a normal position by elastic resilience of the tongue part. The larynx of the model is exposable through the mouth on manipulation of the tongue and epiglottis parts with the blade of a laryngoscope. A primary use of the model is in teaching non-specialist personnel to insert an endotracheal tube correctly in the trachea for resuscitation purposes.

A jaw and a trachea may be movably mounted for teaching appropriate procedures for difficult cases.

6 Claims, 5 Drawing Figures

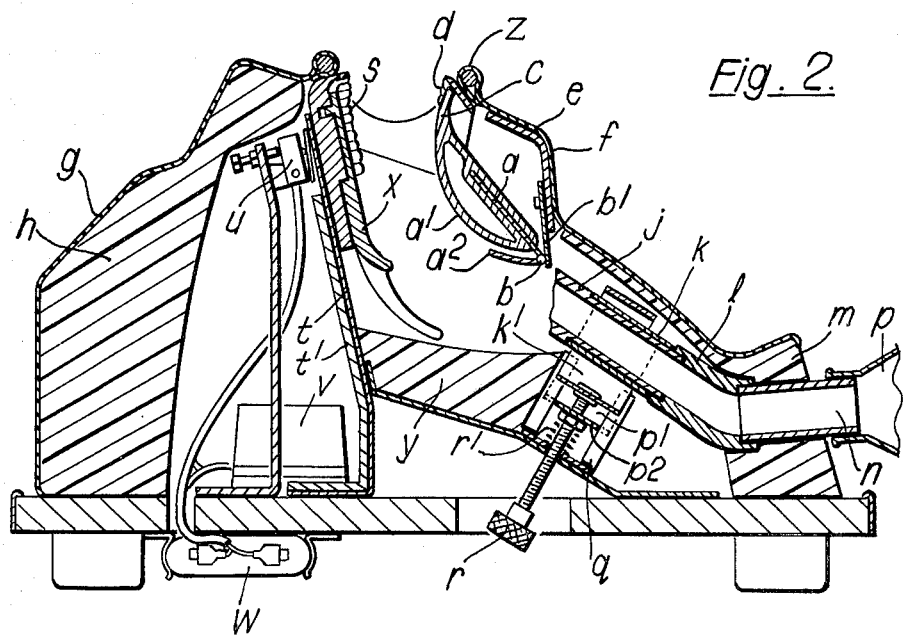
Fig. 2.
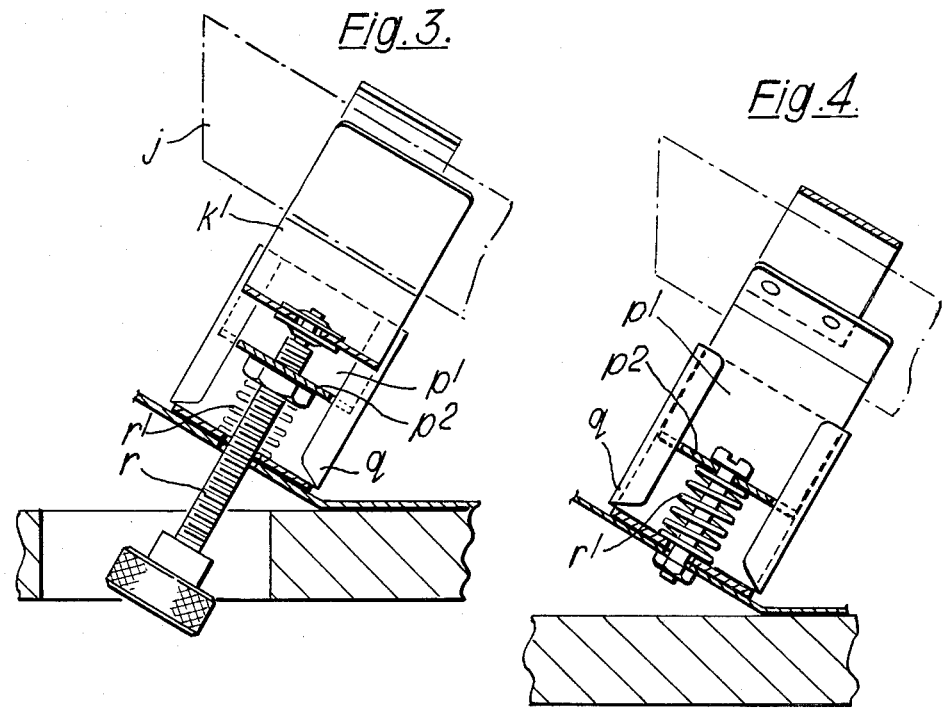
Fig. 3.
Fig. 4.

RESPIRATORY APPARATUS

The present invention relates to respiratory apparatus and has as an object the provision of means for facilitating the use thereof.

Resuscitation via an endo-traceal tube is often required in emergency situations, and an object of the present invention is to provide means whereby some measure of experience of the requisite intubation technique can be obtained by non-specialised personnel, e.g. nursing staff, ambulance crews or general medical practitioners, without the use of actual human subjects.

In accordance with the present invention, there is provided an anatomical model for teaching the intubation of the human trachea said model having larynx tongue, epiglottis and mouth parts, the epiglottis and tongue parts being simulated by an assembly which is pivotally movable and biased into a normal position by elastic resilience of the tongue part so as to simulate visual exposure of the larynx by manipulation through the mouth with a laryngoscope.

Using the model, practice may be obtained in the art of exposing the larynx to view through the mouth by means of a laryngoscope, recognising the larynx and inserting an endotracheal tube for resuscitation purposes. By such practice it is possible for personnel to become sufficiently competent and confident to perform on a subject in emergency situations.

For realism, and to provide experience of the kind of manipulation which may be the lips, of the lips, the lip parts are advantageously formed of resiliently deformable material.

Additionally it is desirable to provide the model with an internal rigid lower jaw part which is movable anteriorly, such movement sometimes being required on an actual subject.

A result of incorrect intubation can be intubation of the oesophagus rather than the trachea. It is desirable to provide the model with a retro-laryngeal oseophageal pathway, so that this effect can be demonstrated.

In practice, some trainees tend to lever the laryngoscope against the upper teeth. By incorporating an alarm device sensitive to force exerted on the teeth — e.g. a switch operting a buzzer or lamp — this tendency can be discouraged.

For best results the model may be provided with interchangeable upper dentures so that experience with different tooth configurations and distributions can be obtained. Additionally or alternatively the larynx may be resiliently mounted for posterior movement under externally applied manual pressure and is preferably adjustable in its natural position. In many cases, manipulation of the larynx is required to facilitate the intubation.

With a model having the various preferred features hereinbefore described, a trainee may be presented with most of the difficulties which he is likely to encounter in practice and given the opportunity to learn how to modify his technique as required.

The following description in which reference is made to the accompanying drawings is given in order to illustrate the invention. In the drawings:

FIG. 2 shows the model of FIG. 1 in cross section,

FIGS. 3 and 4 show details of the models on an enlarged scale, and

The drawings are largely self-explanatory. The exterior of the model is moulded from rubber $f$ of such mechanical properties as to give a realistic skin texture and a realistic response to manipulation.

Within the mouth is mounted an epiglottis-tongue assembly having a metal insert $a$ pivotally mounted at $b$ upon a pin carried by a mounting plate $b'$. The tongue part $a'$ is a hollow rubber moulding formed with perforations to permit ingress and egress of air as it is manipulated. The epiglottis $a^2$ is represented by part of the metal insert which is coated with rubber to give it a natural texture and appearance. Movement of the epiglottis is opposed by the elasticity of the tongue part, the tip of which is restrained in the region of the lower lip at $c$.

Lower teeth $d$ are mounted upon a lower jaw moulding $e$ of rigid polyurethane. Moulding $e$ is held only by the exterior rubber moulding $f$ and thus has realistic freedom of movement when manipulated.

Within the skull-part $g$ of the exterior moulding $f$ is a solid moulding $h$ of flexible polyurethane which gives the head a realistic feel.

Figure 1:
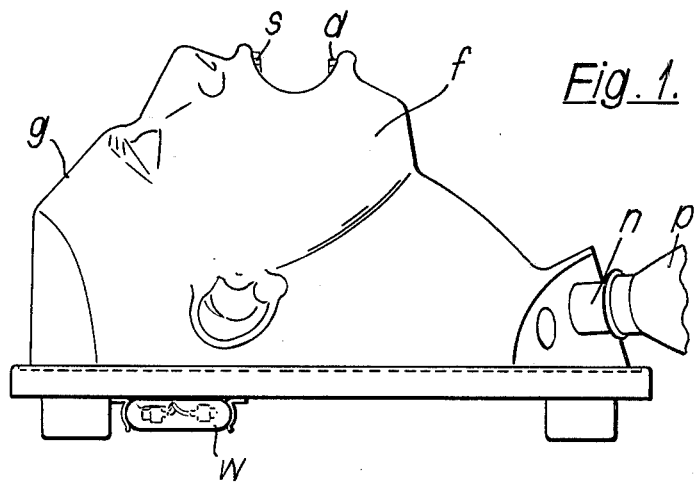
FIG. 1 is a side elevation of a preferred embodiment of the model.
Figure 5:
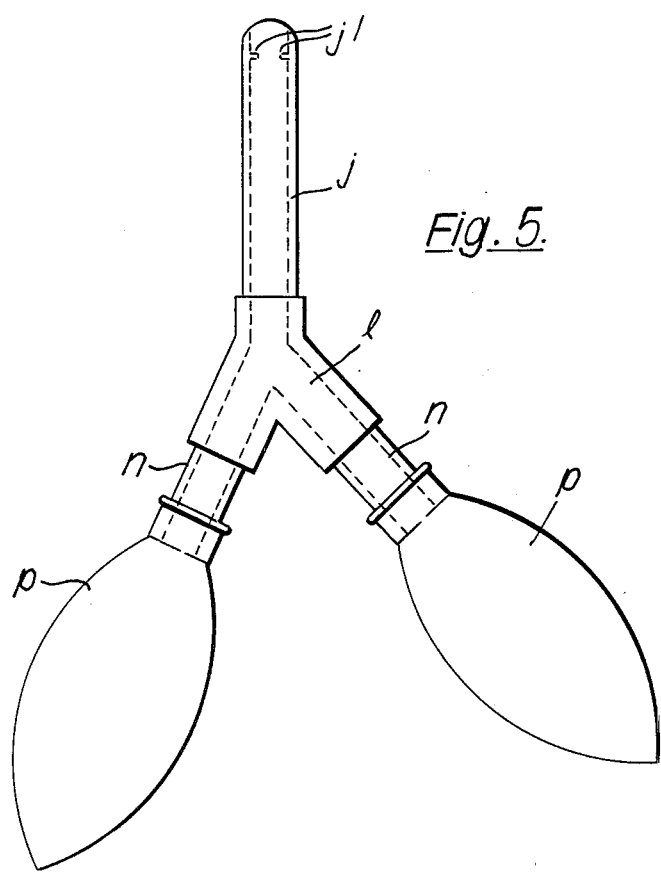
FIG. 5 shows details of the trachea and lung assembly.

Trachea tube $j$ of flexible material, having vocal cord formations $j'$ (FIG. 5), passes through a short rigid tube $k$ and connects with a bronchi bifurcation block $l$. Tube $k$ is mounted by a clamp $k'$ upon a slider $p'$, slidably carried within a bracket $q$ and biassed anteriorly away from the bracket by a pair of springs of which one, $r'$ is shown in FIG. 4. The spacing of the clamp $k'$ from the posterior end $p^2$ is adjustable, over a range of 1cm. by a screw $r$. Thus the trachea tube is movable posteriorly against spring pressure from an adjustable position.

Block $l$ communicates with a pair of bronci tubes $n$, carried by an elastomeric moulding $m$, said tubes terminating in a pair of inflatable bags $p$ which represent lungs.

An interchangeable set of upper teeth is resiliently mounted upon a bracket $t$, stiffened by a member $t'$, and backed by a microswitch $u$ operable to actuate a buzzer $v$ which is energised by a battery $w$ when teeth $s$ are disturbed. The roof of the mouth $r$, together with the uvula and the throat $y$, are provided in the form of elastomeric mouldings shaped as shown. The lips are stiffened internally by a ring $z$.

Moulding $y$ has an edge which is in contact, or nearly in contact, with trachea tube $j$ to simulate an oesophageal pathway visible posterior to the larynx when the tongue and the epiglottis are manipulated with the blade of a laryngoscope to give a straight line of sight through the mouth.

Training features provided by the model may be summarised as follows:

1. The skin is textured and mobile, and the lips are sufficiently supple to enable the operator to mould and retract them during manipulation.
2. The lower jaw is mobile and can be moved forward by up to 2.0 cm.
3. The larynx assembly may be moved anteriorly or posteriorly in relation to the spine, thereby introducing a varying degree of difficulty for the trainee operator.
4. The larynx can be depressed by downward pressure as in the human subject—demonstrating the useful manoeuvre often used to facilitate a difficult laryngeal view, as when the larynx is lying in an anterior position.

5. The depression of the larynx in fact simulates Sellick's method of cricoid pressure and is pre-adjustable by spring pressure to require about 0.3Kg/cm² — equal to that required to satisfactorily effect this manoeuvre in actual practice.

6. A retro-laryngeal oesophageal pathway is represented in the correct anatomical position, for demonstrating inadvertent intubation of the oesophagus.

7. The trainee is discouraged from levering the laryngoscope against the upper teeth by a buzzer alarm.

8. The tongue/epiglottis configuration provides effective simulation of the laryngoscope blade action:
   a. to depress the tongue thus revealing the tip of the epiglottis, then
   b. flexing the epiglottis towards the tongue thus revealing the entrance to the trachea, vocal chords etc.

9. The bifurcation of the trachea follows an anatomical angle and allows a long endotracheal tube to find its way into the right bronchus, thus demonstrating the value of choosing a correct length of tube.

10. The upper denture is readily detachable. The degree of difficulty for the trainee can be varied by the provision of dentures with different forms. Two alternative sets are provided as standard; one with protruding teeth, the other a partial set.

I claim:

1. An anatomical model for teaching the intubation of the human trachea said model having a larynx part, mouth parts, a tongue part, an epiglottis part joined to the base of the tongue part, an anteriorly movable lower jaw part and a pivotal mounting carried by the lower jaw part and positioned adjacent the junction of the epiglottis and tongue parts, the epiglottis and tongue parts being simulated by an assembly which is pivotally movable about said pivotal mounting and biassed into a normal position by elastic resilience of the tongue part, said elastic resilience and anterior movability of the tongue part with the jaw part co-operating to simulate visual exposure of the larynx part by manipulation through the mouth parts with a laryngoscope.

2. A model according to claim 1 having lip parts formed of resiliently deformable material, said lip parts simulating the lips of a human mouth.

3. A model according to claim 1 having a formation representing a retro-laryngeal pathway in addition to the larynx part.

4. A model according to claim 1 having a set of interchangeable upper dentures providing a choice of upper teeth formations.

5. A model according to claim 1 in which the larynx is resiliently mounted for posterior movement under externally applied manual pressure.

6. A model according to claim 5 in which the larynx is carried by adjustable means operable to position the larynx over a range of chosen natural positions from which it is resiliently displaceable by said manual pressure.

* * * * *

UNITED STATES PATENT OFFICE
CERTIFICATE OF CORRECTION

PATENT NO. : 3,874,093
DATED : April 1, 1975
INVENTOR(S) : DIETMAR RUDOLF GARBE

It is certified that error appears in the above—identified patent and that said Letters Patent are hereby corrected as shown below:

Column 1, Line 29: Delete "manipulation which may be the lips, of the lips, the lip"

Insert: --manipulation which may be required of the lips, the lip --

Signed and Sealed this twenty-second Day of July 1975

[SEAL]

Attest:

RUTH C. MASON
Attesting Officer

C. MARSHALL DANN
Commissioner of Patents and Trademarks